United States Patent Office 2,748,111
Patented May 29, 1956

2,748,111

PREPARATION OF CELLULOSE ETHER DERIVATIVES

Vernon R. Grassie, Landenberg, Pa., and Eugene D. Klug, Wilmington, Del., assignors to Hercules Powder Company, Wilmington, Del., a corporation of Delaware No Drawing. Application October 25, 1950, Serial No. 192,138

6 Claims. (Cl. 260—226)

This invention relates to hydroxyethyl cellulose acetate and its preparation, and more particularly to a relatively undegraded hydroxyethyl cellulose acetate having greatly improved uniformity and solubility characteristics, and to an improved process for producing it.

Various methods have been proposed and utilized for the preparation of hydroxyethyl cellulose acetate. Generally, the processes heretofore proposed have been found deficient in simplicity and economy and the products obtained have been excessively degraded and/or have lacked desired uniformity and desired solubility.

It has now been found that excessive degradation, poor uniformity, and poor solubility characteristics in prior art hydroxytehyl cellulose acetates have been due largely to impairment of the reactivity of the starting hydroxyethyl cellulose during its preparation. Either contamination with excessive amounts of inorganic ash impurities or a poor physical structure exemplified by dense, hard, horny, or "case-hardened" particles, or both, have resulted in impaired reactivity. Such material cannot be acetylated to produce a relative undegraded hydroxyethyl cellulose acetate of good uniformity and good solubility characteristics essential for commercial application of the product.

Now in accordance with this invention hydroxyethyl cellulose acetate is prepared by washing a crude hydroxyethyl cellulose containing not more than about 1.4 hydroxyethyl groups for each anhydroglucose unit in the cellulose with a nonalkaline aqueous medium containing at least about 20% by weight of water to an ash content less than about 0.2% by weight, displacing the aqueous washing medium from the hydroxyethyl cellulose with an inert, volatile, water-miscible organic solvent containing not more than about 15% by weight of water, removing the displacing solvent from the hydroxyethyl cellulose substantially completely, acetylating the so-treated hydroxyethyl cellulose, and recovering hydroxyethyl cellulose acetate. In a preferred embodiment of the invention wherein a crude hydroxyethyl cellulose is prepared by treating cellulose in the presence of alkali with a hydroxyethylating agent, the alkali remaining in the resulting crude hydroxyethyl cellulose is neutralized substantially completely before washing with the nonalkaline aqueous medium.

The hydroxyethyl cellulose which has been treated in accordance with the washing, displacement, and removal steps of this invention is highly purified and is characterized by a soft, open, porous texture. It is uniformly highly reactive and acetylates uniformly and easily to a smooth acetylation dope relatively free of undissolved fibers or particles.

The hydroxyethyl cellulose acetates in accordance with this invention have not more than about 1.4 hydroxyethyl groups and at least about 2.45 acetyl groups for each anhydroglucose unit in the cellulose. They are further characterized by being relatively undegraded and by having good uniformity and good solubility characteristics, being substantially completely soluble in methylene chloride, ethylene dichloride, and dioxane to form smooth solutions substantially free of haze, and having a degree of polymerization corresponding to an intrinsic viscosity in acetone of at least about 0.8.

Having described the invention in a general way, the following examples are given to illustrate specific embodiments thereof but these are not to be construed as limiting the invention. All parts are by weight unless otherwise noted.

Example 1

One part of shredded cotton linters was suspended with agitation in 24 parts of the azeotropic mixture of isopropanol and water containing approximately 87% by weight of isopropanol in a closed reactor provided with a mechanical stirrer. Air in the reactor was displaced with nitrogen gas and 0.8 part of aqueous 50% sodium hydroxide solution was added to the slurry of cotton linters in 87% isopropanol with continued agitation over a period of about 10 minutes at room temperature, and agitation was continued for another hour. At this point 0.36 part of ethylene oxide dissolved in 0.8 part of 87% isopropanol was added. The reaction mixture was then raised to a temperature between 65° C. and 69° C. in about 1.5 hours and was held within this temperature range for an additional 5-hour period with agitation. At this stage the reaction mixture contained a suspension or slurry of crude hydroxyethyl cellulose in substantially the same particulate form as the starting cellulosic material.

The reaction slurry was neutralized to phenolphthalein with acetic acid, the liquor was then drained off and the crude hydroxyethyl cellulose was suspended in an aqueous methanol solution containing 70% methanol and 30% water. The product was then exhaustively washed by displacement with a 70:30 methanol-water mixture. Approximately 44 parts of the aqueous methanol solution was employed in washing the product. The aqueous methanol was then displaced from the washed hydroxyethyl cellulose by means of anhydrous methanol which was then removed substantially completely by drying overnight at 65° C. in a vacuum oven. The product was then stored at 70° F. and 50% relative humidity for several days prior to being acetylated.

The resulting hydroxyethyl cellulose had an ash content of 0.004% calculated as sodium sulfate and a degree of substitution equivalent to 0.45 hydroxyethyl group for each anhydroglucose unit in the cellulose as determined by the analytical method of P. W. Morgan, Industrial and Engineering Chemistry, Analytical Edition, vol. 18, page 500, 1946, and was further characterized by having a soft, open, porous texture. The product was in the same fibrous form as the starting cellulosic material.

One part of this hydroxyethyl cellulose was then pretreated with 0.45 part of glacial acetic acid and allowed to stand at room temperature for approximately 4 days.

An acetylating mixture was prepared by mixing 2.78 parts of acetic anhydride and 5.25 parts of methylene chloride per part of hydroxyethyl cellulose. 0.0048 part of 67% perchloric acid and 0.0115 part of aqueous 67.7% zinc chloride solution were added to the above acetylating mixture which was cooled to about 5° C.

The pretreated hydroxyethyl cellulose was thoroughly wetted with all of the chilled acetylating mixture and transferred to an acetylating vessel equipped with a stirrer and a reflux condenser. The temperature of the mixture in the acetylating vessel was brought to approximately 35° C. with agitation. Acetylation proceeded smoothly and uniformly to a homogeneous, substantially fiber-free, primary acetylation dope in approximately 3½ hours, the maximum temperature reached being 47° C. The acetylation dope at the end of this time had a viscosity of 120 sec. as determined by the time of fall of a 1/16-inch steel ball through 1 inch of dope at 40° C.

Acetylation was arrested at this point by adding 1.64 parts of aqueous 50% acetic acid to the acetylation dope, and the catalyst was neutralized with 0.55 part of aqueous 32% sodium acetate solution.

Methylene chloride was removed by distillation, the remaining dope was diluted with about 3.1 parts of acetic acid, and water was added slowly with agitation until the charge became opaque and in a state of incipient precipitation. Precipitation was then completed by adding an excess of water. The product was purified by water washing and was air-dried at about 55° C.

The hydroxyethyl cellulose acetate prepared as described above had a degree of polymerization corresponding to an intrinsic viscosity in acetone of 2.5. It was substantially completely soluble in methylene chloride, ethylene dichloride, dioxane, acetone, and ethyl acetate to form smooth solutions substantially free of haze. Analysis showed it to contain 0.45 hydroxyethyl group and 2.94 acetyl groups for each anhydroglucose unit in the cellulose. It was thus a relatively undegraded product having good uniformity and good solubility characteristics, and was especially well suited for production of free films having unusually good strength and flexibility.

Example 2

A batch of hydroxyethyl cellulose was prepared by substantially the same procedure set forth in Example 1 employing 1 part cotton linters, 14.4 parts of 87% isopropanol, 0.8 part of aqueous 50% sodium hydroxide, and 0.24 part ethylene oxide. The crude reaction product following etherification was neutralized to phenolphthalein with acetic acid. It was then washed exhaustively with water to remove substantially all ash. The water was then displaced from the product by washing exhaustively with anhydrous methanol, and the product was dried overnight in vacuo at 70° C. The resulting product was substantially ash-free and contained 0.36 hydroxyethyl group for each anhydroglucose unit in the cellulose. It had a soft, fibrous physical structure which was open and porous.

One part by weight of this purified hydroxyethyl cellulose, conditioned at 50% relative humidity and 70° F. was pretreated with 0.4 part of glacial acetic acid, and was added at room temperature to a mixture of 8.3 parts of methylene chloride, 3.5 parts of acetic anhydride and 0.82% sulfuric acid based on the air-dry weight of the hydroxyethyl cellulose in a suitable acetylation vessel. Acetylation was carried out in accordance with the procedure set forth in Example 1. Acetylation proceeded smoothly and uniformly to a homogeneous, substantially fiber-free, primary acetylation dope in approximately one hour. A portion of the primary acetylation product was precipitated, washed and dried in accordance with the procedure set forth in Example 1. The recovered primary hydroxyethyl cellulose acetate contained 0.36 hydroxyethyl group and 2.93 acetyl groups for each anhydroglucose unit in the cellulose. It was substantially completely soluble in methylene chloride, ethylene dichloride, dioxane, acetone and ethyl acetate to form smooth solutions substantially free of haze, and it formed free films having unusually good strength and flexibility.

The remainder of the primary acetylation dope was diluted with sufficient aqueous 50% acetic acid to convert remaining acetic anhydride to acetic acid and provide an excess for hydrolysis. Sufficient sulfuric acid was then added so that the dope contained 7.1% sulfuric acid based on the air-dry weight of the initial hydroxyethyl cellulose. The dope was then heated with agitation to 55°–65° C. and methylene chloride was distilled off. The batch was hydrolyzed for a total of 6¼ hours within the 55°–65° C. temperature range, after which the catalyst was neutralized with aqueous 32% sodium acetate, as in Example 1. After precipitation, purification and drying as in Example 1, the resulting hydroxyethyl cellulose acetate was a hydrolized product having 0.36 hydroxyethyl group and 2.80 acetyl groups for each anhydroglucose unit in the cellulose, and having a degree of polymerization corresponding to an intrinsic viscosity in acetone of 1.63. It was substantially completely soluble in methylene chloride, ethylene dichloride, dioxane, acetone and ethyl acetate to form smooth solutions substantially free of haze. It was a relatively undegraded product having good uniformity and good solubility characteristics, and was suitable for use in plastics and other applications requiring a hydrolyzed product.

Example 3

A batch of hydroxyethyl cellulose was prepared in accordance with Example 2 with the exception that the azeotropic mixture of isopropanol and water (approximately 87% isopropanol) was used in place of anhydrous methanol as the inert, volatile, water-miscible organic solvent to displace the aqueous washing medium (water) from the hydroxyethyl cellulose. The purified hydroxyethyl cellulose was then acetylated in accordance with Example 2, employing 0.95% sulfuric acid instead of 0.82%, as in Example 2, as acetylation catalyst. The primary acetylation dope was then treated in accordance with the precipitation, washing and drying procedure set forth in Example 1. The primary hydroxyethyl cellulose acetate thus recovered had substantially the same substitution and the same properties as the primary product of Example 2, and formed free films having unusually good strength and flexibility.

It is important that the hydroxyethyl cellulose be purified to an ash content less than about 0.2% and also at the same time that it have a uniformly soft, open, porous structure in order for it to acetylate uniformly and without difficulty and in order to obtain a relatively undegraded hydroxyethyl cellulose acetate having good uniformity and good solubility characteristics. The presence of ash impurities appreciably in excess of about 0.2% by weight, based on the hydroxyethyl cellulose, calculated as sodium sulfate, interferes seriously with uniform acetylation and is likely to impart undesired haze to the resulting hydroxyethyl cellulose acetate. Likewise, hydroxyethyl cellulose contaminated with dense, hard, horny, or "case-hardened" material is seriously impaired with respect to reactivity and cannot be uniformly acetylated. Hydroxyethyl cellulose acetate recovered from a non-uniform acetylation reaction lacks desired uniformity and desired solubility characteristics. Thus, purification to an ash content less than about 0.2% by weight and a uniformly soft, open, porous structure are both important attributes of the hydroxyethyl cellulose in accordance with this invention and the absence of either of these attributes defeats recovery of a relatively undegraded hydroxyethyl cellulose acetate having good uniformity and good solubility characteristics.

The first step in accordance with this invention is accomplished by washing a crude hydroxyethyl cellulose containing not more than about 1.4 hydroxyethyl groups for each anhydroglucose unit in the cellulose with a nonalkaline aqueous medium containing at least about 20% by weight of water to an ash content less than about 0.2% by weight. Any crude hydroxyethyl cellulose within this range of substitution can be purified by washing in accordance with this invention. A crude product is meant to include hydroxyethyl celluloses contaminated with inorganic ash ingredients, and in certain instances, with water-soluble organic impurities such as polymers of ethylene oxide formed as a by-product during hydroxyethylation with ethylene oxide. The usual inorganic ash impurities include unneutralized sodium hydroxide, potassium hydroxide, or equivalent alkali employed in the preparation of hydroxyethyl cellulose, or salts of such alkalies formed by neutralizing the free alkali with acids such as carbon dioxide, acetic, hydrochloric, and the like. Although these constitute the usual inorganic impurities, such impurities are not limited to these alone, but may include various other inorganic impurities including alkaline earth and/or heavy metal salts.

The nonalkaline aqueous washing medium must contain at least about 20% by weight of water in order to extract effectively the inorganic impurities present. Suitable aqueous washing media in accordance with this invention include distilled water, various industrial plant waters, preferably demineralized or the like, ordinary drinking water, and mixtures of water with various water-miscible organic compounds including methyl, ethyl, propyl, isopropyl alcohols, acetone, dioxane, formic, acetic, propionic, oxalic acids, and the like. In certain circumstances water containing small amounts of inorganic acids such as hydrochloric, nitric, and the like is useful for extracting some ash ingredients. However, such mixtures should be very weakly acidic, corresponding to a pH of 5.0 or higher, in order to avoid any danger of degradation during the washing treatment. Under no circumstances should the washing medium be alkaline to phenolphthalein. Preferably, it should be neutral or slightly acid. Selection of a suitable washing medium will depend somewhat on the degree of hydroxyethyl substitution in the crude hydroxyethyl cellulose. For example, at a substitution of about 0.3 or lower, water is economically the most practical medium since the water solubility of such hydroxyethyl celluloses is only slight at this level of substitution. However, water solubility increases rapidly with increased hydroxyethyl substitution, and above a substitution of about 0.5, mixtures of water-miscible organic compounds with water are preferred in order to avoid undue loss of product due to solution in the washing medium. Suitable mixtures contain, for example, between about 20% and about 80% by weight of the water-miscible organic compound and correspondingly between about 80% and 20% of water. A very satisfactory mixture for washing any crude hydroxyethyl cellulose having hydroxyethyl substitutions below about 1.0 is composed of 70% methanol and 30% water by weight. In the range of substitution between about 1 to about 1.4, a mixture of 80% methanol and 20% water is preferred to avoid undue loss of product by solution. Above about 1.4 substitution hydroxyethyl celluloses are excessively soluble in the washing media of this invention.

Washing should be continued until the ash content of the hydroxyethyl cellulose is less than about 0.2% by weight. Experience has shown that this is the maximum ash content which can be tolerated without serious interference with subsequent acetylation and without danger of imparting an undesirable haze to solutions and films of the recovered hydroxyethyl cellulose acetate. Removal of ash ingredients can, of course, be followed by ordinary well-known analytical methods but this is necessarily slow and inconvenient. A very simple means for following the course of ash removal is to introduce tracer ions at the beginning of the washing operation and then wash until the tracer ions are completely removed as shown by tests on the wash liquor. A few drops of hydrochloric acid conveniently supplies chloride ions as the tracer and washing is continued until the wash liquor is free of chloride ions as determined by tests. Experience has shown that ash content by analytical methods is always less than 0.2% by weight when washing has been carried out in the presence of tracer ions, such as chloride ions, until the tracer ions are completely removed. Any of the well-known methods of washing are applicable including displacement, decantation, spray washing on a filter or in a centrifuge, and the like.

In a preferred embodiment of the invention, after the cellulose has been hydroxyethylated in the presence of alkali, the alkali is substantially completely neutralized prior to the washing step. This is accomplished by adding an acid to the crude hydroxyethyl cellulose until tests establish that all alkali has been neutralized and a slight excess of acid is present. Suitable acids for this purpose include hydrochloric, nitric, formic, acetic, carbon dioxide, and the like. Hydrochloric acid is particularly effective since it provides chloride ions which can be easily detected. The material is then washed until free of chloride ions.

Following the washing step, the aqueous washing medium is displaced from the hydroxyethyl cellulose with an inert, volatile, water-miscible organic solvent containing not more than about 15% by weight of water. This is an important feature of the invention, for experience has shown that hydroxyethyl cellulose, which has been dried directly following treatment with the aqueous washing medium, thus omitting this displacement step, invariably has a dense, hard, horny, or "case-hardened" physical structure which seriously impairs the reactivity of the hydroxyethyl cellulose so that it does not acetylate uniformly or readily. By contrast, hydroxyethyl cellulose from which the aqueous washing medium has been displaced with an inert, volatile, water-miscible organic solvent containing not more than about 15% by weight of water has a soft, open, porous structure and does not lose this structure or uniform reactivity upon subsequent drying.

Suitable inert, volatile, water-miscible organic solvents for displacing the aqueous washing medium include anhydrous methanol, ethanol, propanol, isopropanol, acetone, dioxane, and the like, and mixtures of these with small amounts of water such as, for example, the azeotropic mixtures of ethyl alcohol with water and of isopropanol with water. A preferred displacing solvent is anhydrous methanol. In no instance should the displacing solvent in accordance with this invention contain more than about 15% by weight of water. Suitable inert, volatile, water-miscible organic solvents are essentially neutral materials having no tendency to react with the hydroxyethyl cellulose being treated. They are sufficiently volatile so that they can be substantially completely removed from the hydroxyethyl cellulose by heating in vacuo at about 70° C. overnight. They are miscible with water in all proportions.

Treatment with the displacing solvent is continued until the aqueous washing medium has been substantially completely removed. Ordinarily, about four displacement washes, employing several volumes of displacing solvent for each volume of hydroxyethyl cellulose being treated in each wash, are sufficient. Displacement is easily followed by means of specific gravity or refractive index determinations made on the fresh displacing solvent and again after use, and continuing treatment until constant values are obtained.

The displacing solvent is then removed substantially completely from the hydroxyethyl cellulose. Ordinarily, this is accomplished by drying in vacuo at about 70° C. to constant weight. Usually, overnight drying is sufficient. The displacing solvent can, if desired, be removed by drying at atmospheric pressure at room temperature or at slightly elevated temperatures up to about 70° C.

The resulting purified hydroxyethyl cellulose has a uniformly soft, open, porous physical structure and is uniformly highly reactive. It acetylates easily and uniformly by any of the conventional and well known acetylation processes for acetylating cellulose and cellulose derivatives, including both solution and fibrous acetylation processes. Any of the well known cellulose acetylation catalysts can be employed under conditions familiar to anyone skilled in the art.

Partially hydrolyzed hydroxyethyl cellulose acetates are obtained in accordance with this invention by hydrolyzing the primary product following acetylation by conventional and well known cellulose acetate hydrolysis procedures.

Similarly, recovery of either the primary or partially hydrolyzed products of this invention is accomplished by any of the well known and conventional washing, grinding, bleaching, and drying procedures commonly employed with cellulose acetate, as desired.

The hydroxyethyl cellulose acetates prepared in accordance with this invention are particularly characterized by being relatively undegraded and by having good uniformity and good solubility characteristics in contrast to prior art hydroxyethyl cellulose acetates which have been excessively degraded and/or have lacked good uniformity and good solubility. The term "relatively undegraded" with reference to the products of this invention means that the degree of polymerization of the hydroxyethyl cellulose acetate molecules is sufficiently high to impart good mechanical properties such as tensile strength, flexibility, impact strength, toughness, and the like, to the products. It is well known and understood, of course, that the polymeric molecules of native cellulose necessarily always undergo some degradation during purification of the cellulose and its conversion into derivatives. Such degradation must be controlled and limited, however, in order to retain desirable mechanical properties in the end product.

As is well known in the art, intrinsic viscosity offers the simplest means of characterizing molecular size or degree of polymerization. A low intrinsic viscosity signifies a relatively small molecular size and hence a low degree of polymerization, which in the case of a polymeric material such as cellulose and cellulose derivatives is interpreted to mean excessive degradation with loss of mechanical properties such as tensile strength, flexibility, impact strength, toughness, and the like. A high intrinsic viscosity, on the other hand, signifies a relatively large molecular size and hence a high degree of polymerization which is interpreted to mean a relatively undegraded material with desirable mechanical properties. Measurement of intrinsic viscosity is described in the article by W. E. Davis and J. H. Elliott entitled "Present Status of the Intrinsic Viscosity Determination," Journal of Colloid Science, volume 4, pages 313–20 (1949).

The relatively undegraded products of this invention have a degree of polymerization corresponding to an intrinsic viscosity in acetone of at least about 0.8, and have desirable mechanical properties sufficiently high to make them eminently suitable for use in various applications where such properties are required, such as films, plastics, filaments, and the like. For optimum performance the products preferably have a degree of polymerization corresponding to an intrinsic viscosity in acetone of at least about 1.5. Experience has shown that hydroxyethyl cellulose acetates having a degree of polymerization corresponding to an intrinsic viscosity in acetone much less than about 0.8 are considered to be undesirably degraded for such uses.

Good uniformity and good solubility characteristics of the hydroxyethyl cellulose acetates in accordance with this invention are exemplified by the fact that they dissolve substantially completely in solvents such as methylene chloride, ethylene dichloride, dioxane, acetone, ethyl acetate, and mixtures of these with ethyl alcohol, such as 90:10 solvent:ethyl alcohol mixtures by weight, to form smooth solutions substantially free of haze. This means that solutions of hydroxyethyl cellulose acetate are not contaminated with undissolved, swollen, or gelled granules or fibers, or contaminated with haze-forming impurities. On the contrary, they are clear, smooth, and sparkling in appearance, and compare favorably with similar solutions of high quality commercial cellulose acetates in clarity, smoothness and uniformity.

Although it is not intended that the invention shall be limited to any particular theory of operation, it appears that the substantially ash-free, uniformly reactive nature of the hydroxyethyl cellulose treated in accordance with the washing, displacement and removal steps of this invention makes it possible to readily acetylate the purified hydroxyethyl cellulose to a highly uniform product of good solubility under reaction conditions sufficiently mild so that the resulting hydroxyethyl cellulose acetate is relatively undegraded and thus has useful mechanical properties.

The hydroxyethyl cellulose acetates in accordance with this invention have not more than about 1.4 hydroxyethyl groups and at least about 2.45 acetyl groups for each anhydroglucose unit in the cellulose. Where substantially complete solubility in acetone and ethyl acetate are desirable, a primary hydroxyethyl cellulose acetate must have at least about 0.3 hydroxyethyl group for each anhydroglucose unit in the cellulose. A partially hydrolyzed hydroxyethyl cellulose acetate having at least about 2.45 acetyl groups for each anhydroglucose unit in the cellulose appears to have optimum properties in plastics applications. For film application it has been found that a primary hydroxyethyl cellulose acetate having between about 0.3 and 0.6 hydroxyethyl group and at least about 2.85 and preferably at least about 2.9 acetyl groups for each anhydroglucose unit in the cellulose appears to have optimum properties. By primary hydroxyethyl cellulose acetate is meant one which has not been subjected to hydrolysis of acetyl groups following acetylation.

It must be emphasized that the hydroxyl groups in the substituent hydroxyethyl groups as well as the residual hydroxyl groups attached directly to the cellulose nucleus both acetylate in accordance with this invention. In effect, therefore, regardless of the degree of hydroxyethyl substitution in the cellulose molecule, the total number of replaceable hydroxyl groups for each anhydroglucose unit in the cellulose remains constant at three. Hence, it is possible in accordance with this invention to have an hydroxyethyl cellulose acetate having about 1.4 hydroxyethyl groups and containing up to a maximum of 3 acetyl groups for each anhydroglucose unit in the cellulose.

Numerous applications have been found for the hydroxyethyl cellulose acetates of this invention owing to their relatively undegraded nature combined with their good uniformity and good solubility characteristics. The hydroxyethyl cellulose acetates of this invention can be formulated and fabricated into wrapping foils or photographic film having good tensile strength, elongation, flexibility, water resistance and weathering resistance. Films of primary hydroxyethyl cellulose acetates approximately 5 mils thick having tensile strengths of the order of 12,000–15,000 lbs. per sq. in.; elongation of the order of 15–25%; flexibility of the order of 30–65 double folds; and a water resistance characterized by shrink and swell (reversible elongation) values of the order of 0.6–0.7% are readily prepared.

Generally, the hydroxyethyl cellulose acetates of this invention exhibit the well-known good strength, flexibility and elongation characteristics of high grade commercial cellulose acetates, and are generally superior in these respects to the cellulose mixed esters such as cellulose acetate butyrate. At the same time the new products of this invention exhibit much better resistance to water and to weathering and have better dimensional stability than cellulose acetates, comparing favorably in these respects to cellulose mixed esters such as cellulose acetate butyrate. Thus, the hydroxyethyl cellulose acetates of this invention combine the well-known good strength and toughness characteristics of cellulose acetates with the well-known water resistance, weathering resistance and dimensional stability of commercial mixed esters of cellulose such as cellulose acetate butyrate.

The desirable combination of properties exhibited by the new products of this invention make them suitable for use in light-transmitting reinforced window glazing for solaria, poultry houses and safety areas, in airplane dopes, in artificial textile fibers and artificial brush bristles, in printing inks, in protective coatings, in adhesives, in laminated structures comprising paper, textile fibers or fabrics, wood, metals, glass, glass fibers and woven glass fabrics, and the like, in insulation, in expanded, porous structures, in plastics, and many other applications. Partially hydrolyzed hydroxyethyl cellulose acetates of this invention are especially well adapted for all types of thermoplastic molding including compression, injection and extrusion molding. Injection molding plastics formulated with the products of this invention possess unusual hardness and dimensional stability, and at the same time are readily injection molded at relatively low injection molding temperatures.

Therefore, the improved properties possessed by the products of this invention suggest their use in many applications.

What we claim and desire to protect by Letters Patent is:

1. In a process for the preparation of hydroxyethyl cellulose acetate the improvement which consists essentially of the following steps in the order named: (1) washing a crude hydroxyethyl cellulose containing not more than about 1.4 hydroxyethyl groups for each anhydroglucose unit in the cellulose to an ash content less than about 0.2% by weight with an aqueous medium free of alkalinity to phenolphthalein, and containing at least about 20% by weight of water, (2) displacing the aqueous washing medium from the hydroxyethyl cellulose with an inert, volatile, water-miscible organic solvent containing not more than about 15% by weight of water, (3) subjecting the hydroxyethyl cellulose wet with displacing solvent to drying at a temperature up to about 70° C. to remove said displacing solvent substantially completely from said hydroxyethyl cellulose and produce a dry, solvent-free, uniformly highly reactive hydroxyethyl cellulose having a uniformly soft, open, porous physical structure, (4) acetylating the so-treated hydroxyethyl cellulose to produce uniformly substituted hydroxyethyl cellulose acetate having a degree of polymerization corresponding to an intrinsic viscosity in acetone of at least about 0.8, and (5) recovering the hydroxyethyl cellulose acetate.

2. The process in accordance with claim 1 wherein the aqueous washing medium employed in step 1 is water.

3. The process in accordance with claim 1 wherein the aqueous washing medium employed in step 1 is an aqueous alcohol solution.

4. The process in accordance with claim 1 wherein the aqueous washing medium employed in step 1 is an aqueous methanol solution.

5. The process in accordance with claim 1 wherein the inert, volatile, water-miscible organic solvent employed as displacing solvent in step 2 is anhydrous methanol.

6. The process in accordance with claim 1 wherein the inert, volatile, water-miscible organic solvent employed as displacing solvent in step 2 is the azeotropic mixture of isopropanol and water.

References Cited in the file of this patent

UNITED STATES PATENTS

| | | |
|---|---|---|
| 1,876,920 | Hagedorn et al. | Sept. 13, 1932 |
| 1,994,038 | Hagedorn et al. | Mar. 12, 1935 |
| 2,055,892 | Dreyfus | Sept. 29, 1936 |
| 2,327,397 | Broderick | Aug. 24, 1943 |
| 2,330,263 | Broderick | Sept. 28, 1943 |
| 2,518,203 | Thompson | Aug. 8, 1950 |
| 2,629,716 | Morgan | Feb. 24, 1953 |